United States Patent [19]

Asano

[11] Patent Number: 4,713,703
[45] Date of Patent: Dec. 15, 1987

[54] INFORMATION RECORDING AND REPRODUCING APPARATUS

[75] Inventor: Isao Asano, Furukawa, Japan

[73] Assignee: Alps Electric Co., Ltd., Japan

[21] Appl. No.: 900,502

[22] Filed: Aug. 26, 1986

[30] Foreign Application Priority Data

Aug. 31, 1985 [JP] Japan .......................... 60-132437[U]

[51] Int. Cl.⁴ ............................................ G11B 5/012
[52] U.S. Cl. ...................................... 360/97; 360/98; 360/106
[58] Field of Search ................................... 360/97–99, 360/106

[56] References Cited

U.S. PATENT DOCUMENTS 4,519,010  5/1985  Elsaesser .......................... 360/98 X

FOREIGN PATENT DOCUMENTS

3404231  8/1985  Fed. Rep. of Germany ...... 360/106

Primary Examiner—S. J. Heinz
Attorney, Agent, or Firm—Guy W. Shoup

[57] ABSTRACT

An information recording and reproducing apparatus of the hard disk type comprises a motor for rotatably driving hard disks secured to a driving hub attached to the driving shaft thereof, a pivot assembly having a pivot shaft supporting a swing arm for swing motion thereon, magnetic heads attached to the free end of the swing arm so as to be located opposite to the surfaces of the hard disks, respectively. The lower bearing among the bearings rotatably supporting the driving shaft of the motor and the lower bearing among the bearings rotatably supporting the pivot shaft of the pivot assembly are always urged in the same direction by bearing biasing means, respectively. When gaps are formed between the lower bearing of the motor and the inner wall of the bearing housing and between the lower bearing of the pivot assembly and the inner surface of a hole receiving the pivot assembly due to the difference between the lower bearings and the surrounding parts, the driving shaft of the motor and the pivot shaft are tilted in the same direction practically by the same angle, so that the off-track of the magnetic heads is limited to the lease extent, and hence the deterioration of the recording and reproducing performance of the apparatus due to thermal expansion of the components is prevented.

3 Claims, 9 Drawing Figures

INFORMATION RECORDING AND REPRODUCING APPARATUS

BACKGROUND OF THE INVENTION

1. Field of the Invention

The present invention relates to an information recording and reproducing apparatus and, more particularly, to an information recording and reproducing apparatus of the hard disk type capable of avoiding off-track error.

2. Description of the Prior Art

Figure 5:
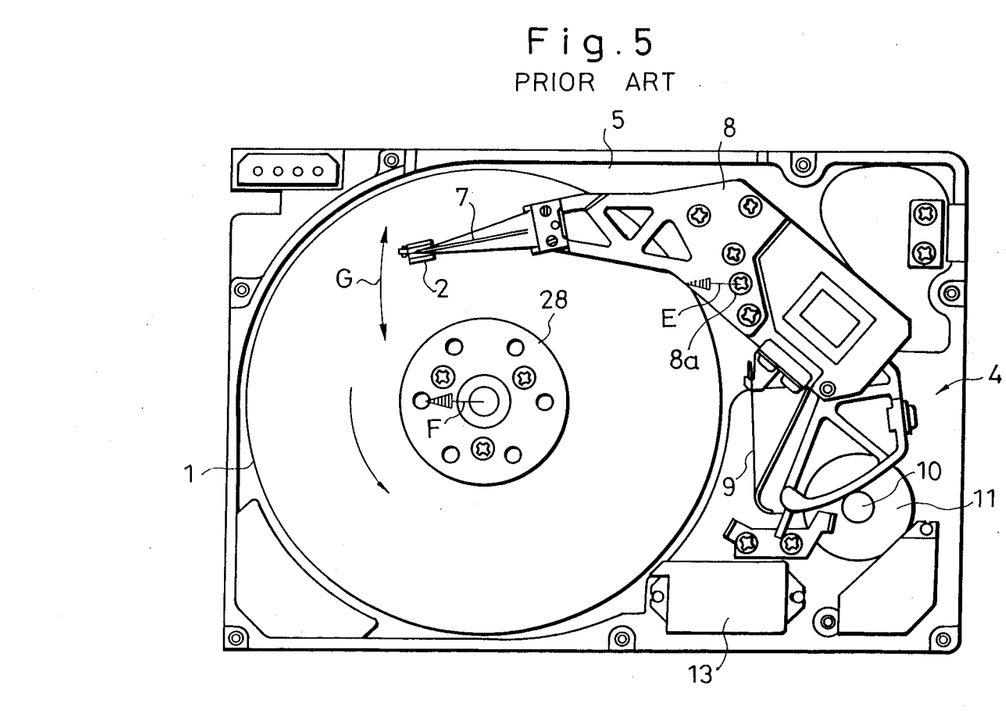
FIG. 5 is a plan view of a conventional information recording and reproducing apparatus.
Figure 6:
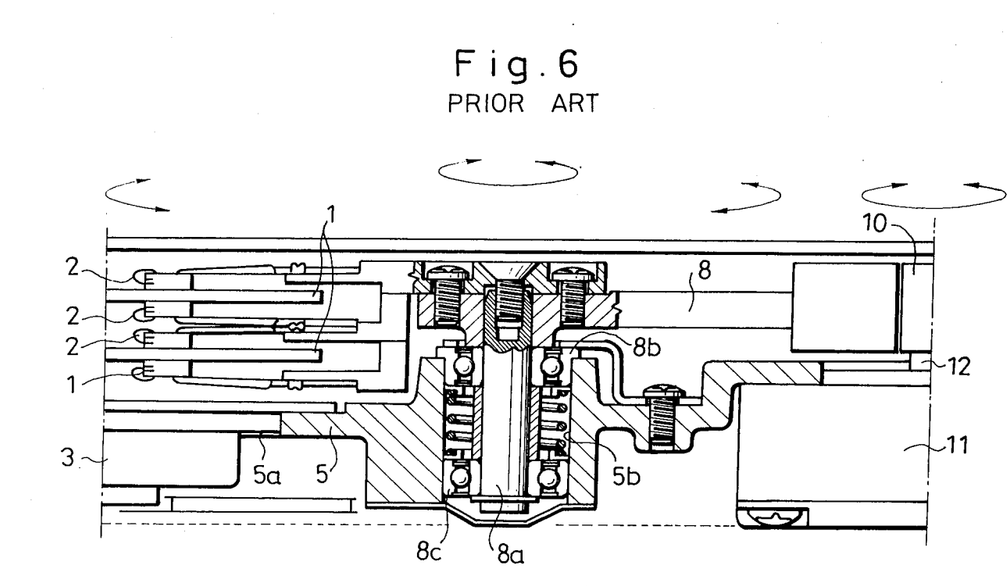
FIG. 6 is a fragmentary sectional view of the information recording and reproducing apparatus of FIG. 5.

A conventional information recording and reproducing apparatus of the hard disk type (hereinafter referred to simply as "recording and reproducing apparatus") is shown in FIGS. 5 and 6. The recording and reproducing apparatus comprises, as principal components, magnetic disks 1, magnetic heads 2 for recording information in the disks 1 and reproducing the information recorded in the magnetic disks 1, a motor 3 for rotatively driving the magnetic disks 1, a magnetic disk driving mechanism 4 for shifting the magnetic heads 2 to a predetermined track of the corresponding magnetic disk 1, a housing 5 accommodating the magnetic disks 1, the magnetic heads 2, the motor 3 and the magnetic head driving mechanism 4, and a top cover for covering up the housing 5.

In this recording and reproducing apparatus, four magnetic heads 2 are provided each for one side of each of two magnetic disks 2 to record information on both sides of each magnetic disk 1. Each magnetic head 2 is attached to the free end of a support spring 7 attached to the free end of a swing arm 8 of the magnetic head driving mechanism 4. The magnetic head driving mechanism 4 comprises the swing arm 8, a steel belt 9 attached to the base end of the swing arm 8, namely, one end of the swing arm 8 opposite the other end supporting the magnetic head 2, a pulley 10 engaging the intermediate portion of the steel belt 9, and a step motor 11. The pulley 10 is secured to the output shaft 12 of the step motor 11. The step motor 11 drives the swing arm 8 for swing motion on a pivot shaft 8a.

A case accommodating the magnetic disks 1, the magnetic heads 2, the swing arm 8, the steel belt 9, the pulley 10 and the associated parts consists of the housing 5 and the top cover, not shown. Gaskets are provided between the contact surfaces of the housing 5 and the top cover and between the step motor 11 and a step motor mounting part and the journal box of the motor 3 is filled with a magnetic fluid to seal the case hermetically. An opening is formed in part of the housing 5 as a breather for maintaining equality of pressure within and without the airtight enclosure of the case and the breather is provided with a filter 13.

Figure 8:
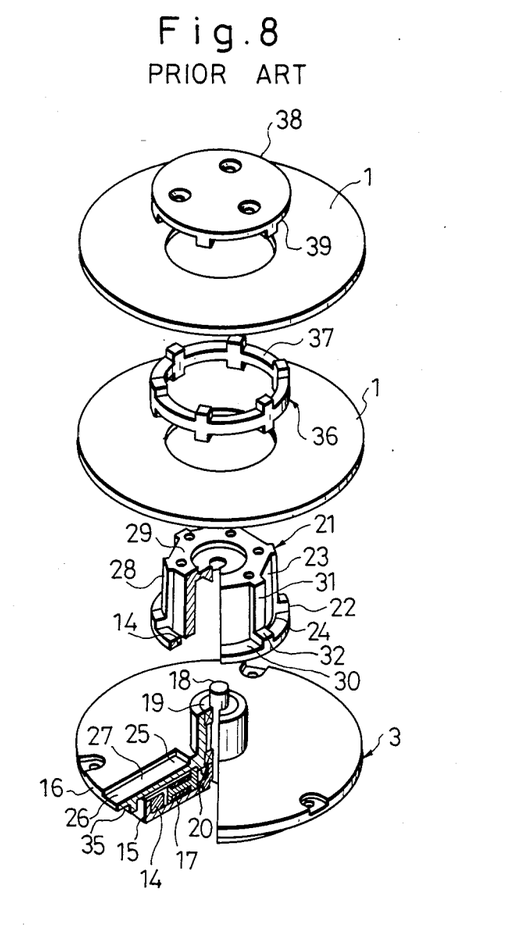
FIG. 8 is an exploded perspective view of a motor employed in the information recording and reproducing apparatus of FIG. 5.
Figure 9:
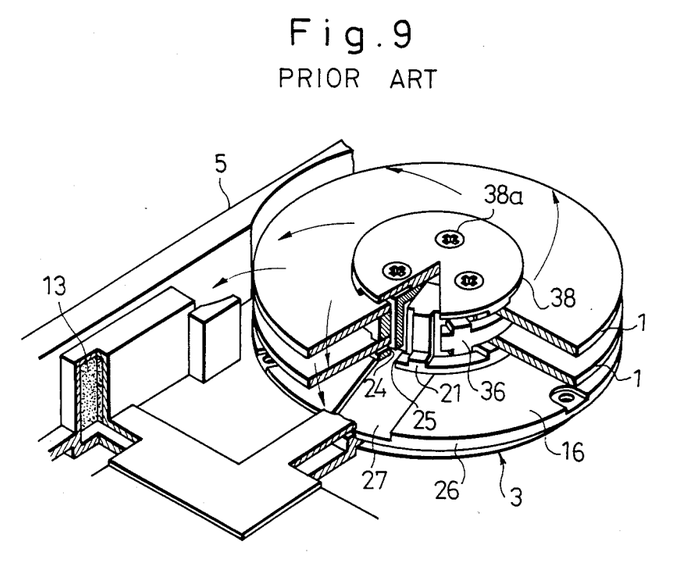
FIG. 9 is a fragmentary perspective view partly broken showing the construction of the motor and magnetic disks.

As illustrated in FIG. 8, the motor 3 for driving the magnetic disks 1 is a direct drive DC brushless motor. The rotor unit 15 of the motor 3, having permanent magnets 14 protrudes from the underside of the housing 5. A flange 16 provided with a boss is disposed over the rotor unit 15 and a driving coil 17 is provided on the underside of the flange 16. Bearings 19 and 20 for rotatably supporting a driving shaft 18 are fitted in the boss of the flange 16. The flange 16 is fitted tightly in a hole formed in the housing 5 and is screwed to the housing 5. As illustrated in FIG. 9, a shallow groove 27 for passing air is formed in the upper surface of the flange 16 so as to extend from the circumference to a position 25 corresponding to an aperture 24 formed in the flange of a driving hub 21 which will be described hereunder.

The driving hub 21 is secured to the driving shaft 18 of the motor 3. The driving hub 21 consists of a cylindrical body 28 and a flange 22 formed at the lower end of the cylindrical body 28, as illustrated in FIG. 8. A plurality of longitudinal grooves 23 are formed in the outer surface of the cylindrical body 28 so as to extend from the top surface 29 of the cylindrical body 28 through openings 24 formed in the flange 22 to the underside of the flange 22, respectively. Recesses 30 are formed in the upper surface of the flange 22 so as to extend from the corresponding grooves 23 to the circumference of the flange 22, respectively. The cylindrical surfaces 31 of the cylindrical body 28 and the upper surface of the flange 22 serve as reference surfaces for positioning the disks 1. The cylindrical surfaces 31 and the upper surface of the flange 22 are finished at a high accuracy with reference to the seating surface 35 of the flange 16 after attaching the driving hub 21 to the driving shaft 18.

A spacer ring 36 is fitted on the driving hub 21 between the two magnetic disks 1. A plurality of recesses 37 are formed in the upper and lower surfaces of the spacer ring 36 so as to extend from the inner circumference to the outer circumference of the spacer ring 36.

A practically disk-shaped clamp 38 having a plurality of radially expanding recesses 39 in the lower surface thereof is fastened to the upper surface 29 of the driving hub 21 with screws 38a to the upper surface 29 of the driving hub 21 to hold the magnetic disks 1 and the spacer ring 36 firmly in place on the driving hub 21.

The motor 3 is fitted in a hole 5a formed in the housing 5; the driving hub 21 is attached to the driving shaft 18 of the motor 3; and the magnetic disks 1 are fitted on and secured to the cylindrical body 28 of the driving hub 21. Thus, the disks 1 are rotated within the housing 5.

Figure 7:
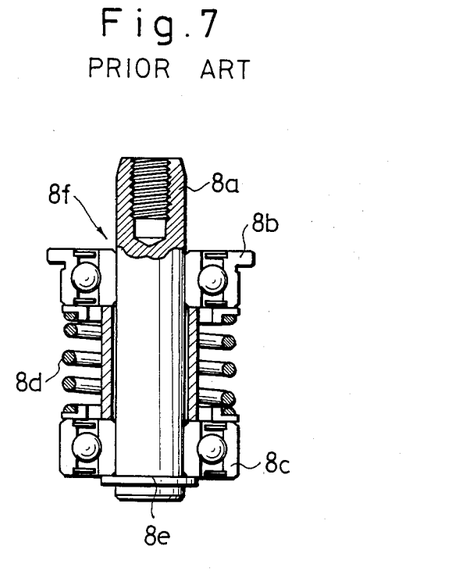
FIG. 7 is a sectional view partly broken of a pivot assembly employed in the information recording and reproducing apparatus of FIG. 5.

The swing arm 8 supporting the magnetic heads 2 is swingable on the pivot shaft 8a. As illustrated in FIGS. 6 and 7, the pivot shaft 8a is supported rotatably on two bearings, namely, upper and lower bearings as viewed in FIGS. 6 and 7, 8b and 8c fitted in a bore 5b formed in the housing 5. The bore 5b receives therein a pivot assembly 8f comprising the pivot shaft 8a, the bearings 8b and 8c, a preloading spring 8d for urging the bearings 8b and 8c away from each other and an E-ring 8e for retaining the bearing 8c in place. The tolerance of fit for fitting the bearing 8b in the bore 5b is in the range of 20 to 30 μm. The clearance between the outer circumference of the bearing 8b and the inner surface of the bore 5b is filled with an adhesive or the like to fix the bearing 8b in the bore 5b. The lower bearing 8c is not fixed.

In this conventional recording and reproducing apparatus, the housing 5 is made of an aluminum alloy through die casting; the bearings 8b and 8c supporting the pivot shaft 8 are made of a stainless steel; the flange 16 of the motor 3 is made of an aluminum alloy through die casting; and the bearings 19 and 20 supporting the driving shaft 18 are made of a high-carbon-chromium bearing steel. That is, the bearings 8b, 8c, 19 and 20 supporting rotary members are made of a stainless steel or a high-carbon-chromium bearing steel, while the members holding these bearings 8b, 8c, 19 and 20 are made of an aluminum alloy. Since the coefficient of thermal expansion of aluminum alloys is greater than those of stainless steels and high-carbon-chromium steels, clearance develops between the housing 5 and the bearings 8b and 8c and between the flange 16 and the bearings 19 and 20, when the temperature of these components rises. When such clearance develops, the driving shaft 18 of the motor 3 and the pivot shaft 8a on which the swing arm 8 turns tilt in random directions, so that off-track occurs, and thereby the recording and reproducing characteristics of the recording and reproducing apparatus are deteriorated. For example, if the radii of the bearings 8b and 8c supporting the pivot shaft 8a are 6.5 mm and the temperature of these bearings 8b and 8c is raised by 30° C., the horizontal dislocation of the pivot shaft 8a is approximately 2 μm.

SUMMARY OF THE INVENTION

Accordingly, it is an object of the present invention to provide an information recording and reproducing apparatus capable of restricting the possibility of off-track error attributable to the difference between the components thereof in thermal expansion to the least possible extent and avoiding the adverse effects of the thermal expansion of the components on the recording and reproducing performance thereof.

The object of the present invention is achieved by an information recording and reproducing apparatus comprising: a motor for rotatably driving information recording media; a driving hub secured to the driving shaft of the motor and fixedly holding the information recording media; a pivot assembly having a pivot shaft and upper and lower bearings supporting the pivot shaft; a swing arm secured to the pivot shaft for swing motion thereon; recording and reproducing heads attached to the free end of the swing arm; biasing means for biasing in one direction the lower bearing, namely, the bearing disposed farthest from the information recording media supported on the driving shaft, among the bearings supporting the driving shaft of the motor; and biasing means for biasing the lower bearing, namely, the bearing disposed farthest from the swing arm, among the bearings supporting the pivot shaft, in the same direction as the means for biasing the lower bearing supporting the driving shaft of the motor so that the driving shaft is tilted in the same direction as the direction in which the pivot shaft is tilted, in order to limit the relative tilt between the pivot shaft and the driving shaft of the motor to the least extent.

The above and other objects, features and advantages of the present invention will become more apparent from the following description of a preferred embodiment thereof taken in conjunction with the accompanying drawings.

BRIEF DESCRIPTION OF THE DRAWINGS

In FIGS. 1 to 9, like reference characters designate like or corresponding parts through out.

DESCRIPTION OF THE PREFERRED EMBODIMENTS

In the following description of a preferred embodiment of the present invention, the description of the same components, constitution and functions as those of the abovementioned conventional recording and reproducing apparatus will be omitted to avoid duplication, and hence those which are not described hereinafter are the same as those of the conventional recording and reproducing apparatus.

Figure 1:
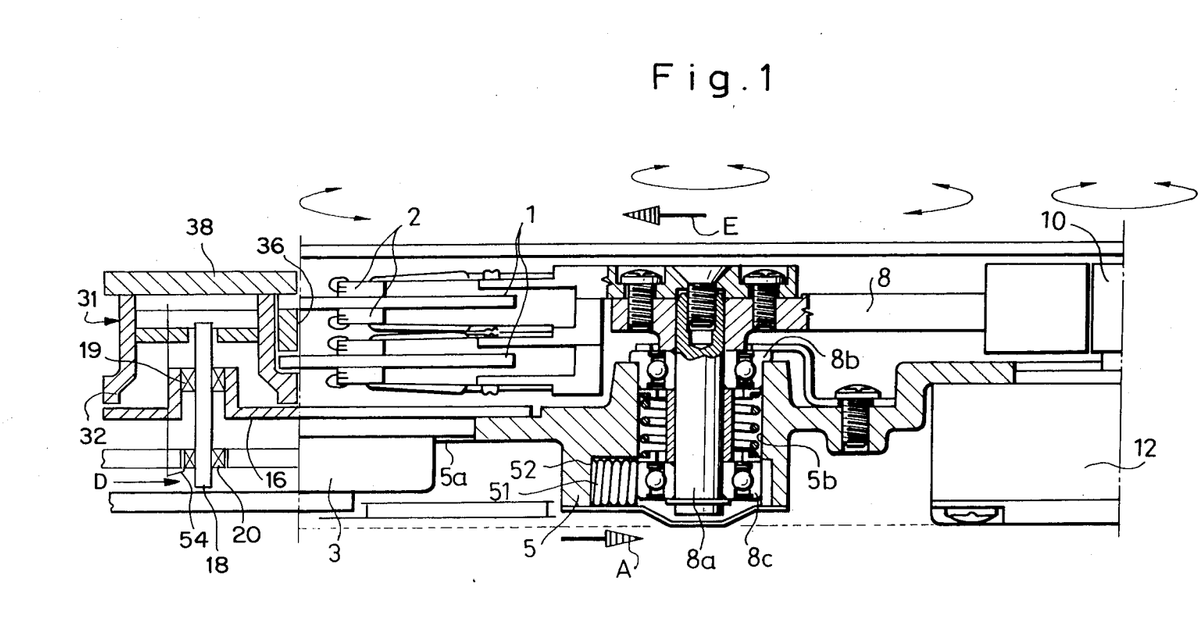
FIG. 1 is a fragmentary sectional view of an information recording and reproducing apparatus according to the present invention, showing a pivot assembly mounted on a housing.

Referring to FIG. 1, a groove 52 for receiving a compression coil spring 51 is formed in the underside of the housing 5 so as to extend from the lower end of the hole 5b for receiving a pivot assembly therein toward the motor 3. The compression coil spring 51 is placed in the groove 52 to push the lower bearing 8c of the pivot assembly in a direction indicated by an arrow A in FIG. 2. An arcuate recess 53 is formed in the inner surface of the hole 5b opposite to the groove 52. Thus, the lower bearing 8c is positioned with the outer race thereof in abutment with two opposite edges B and C of the arcuate recess 53.

Figures 2, 3, 4:
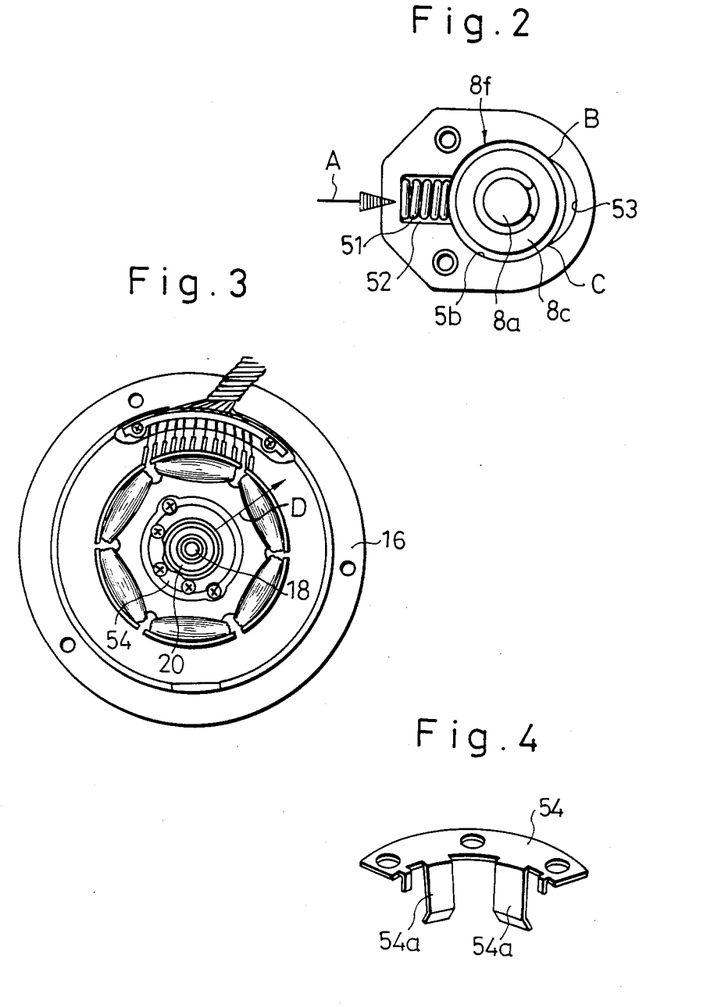
FIG. 2 is a fragmentary bottom view of the information recording and reproducing apparatus of FIG. 1.
FIG. 3 is a bottom view of a motor employed in the information recording and reproducing apparatus of FIG. 1, in which the rotor is removed.
FIG. 4 is a perspective view of a bearing biasing member for biasing the lower bearing of the motor of FIG. 3.

The lower bearing 20, as viewed in FIG. 8, supporting the driving shaft 18 of the motor 3 is urged in a direction indicated by an arrow D with a bearing biasing member 54 formed of a spring plate as shown in FIG. 3. As illustrated in FIG. 4, the bearing biasing member 54 has two elastic legs 54a for pushing the outer race of the bearing 20 at two positions in the fixed direction indicated by the arrow D.

The direction indicated by the arrow A in which the lower bearing 8c supporting the pivot shaft 8a and the direction indicated by the arrow D in which the bearing 20 supporting the driving shaft 18 of the motor 3 are the same and parallel to each other. Accordingly, the tilting direction of the pivot shaft 8a indicated by an arrow E coincides with the tilting direction of the driving hub 21 secured to the driving shaft 18 of the motor indicated by an arrow F. Since the upper bearing 8b, as viewed in FIG. 1, is fixed adhesively with an adhesive to the housing 5 and the lower bearing 8c is movable in the hole 5b, the lower bearing 8c is moved in the direction of the arrow A when a gap develops between the inner surface of the hole 5b and the outer circumference of the lower bearing 8c due to the difference between the housing 5 and the lower bearing 8c in thermal expansion, and thereby the pivot shaft 8a is tilted in the direction of the arrow E. The driving hub 21 secured to the driving shaft 18 of the motor 3 is tilted due to the same reason.

Since the coefficient of thermal expansion of the bearing 8c is practically the same as that of the bearing 20 and the coefficient of thermal expansion of the housing 5 is the same as that of the flange 16, in this embodiment, the gap developed between the inner surface of the hole 5b and the outer circumference of the bearing 8c due to the thermal expansion of the bearing 8c and the casing 5 is substantially the same as the gap developed between the outer circumference of the bearing 20 and the inner surface of the boss of the flange 16 accommodating the bearing 20, and since the bearings 8c and 20 are urged in the same direction, the magnetic heads are scarcely dislocated from the correct position relative to the tracks of the corresponding magnetic disks 1, and hence the possibility of off-track error is limited to the least extent.

The disposition of the compression coil spring 51 and the bearing biasing member 54 is decided properly so as to tilt the pivot shaft 8a and the driving hub 21 in a direction practically perpendicular to the seek direction of the magnetic heads indicated by an arrow G in FIG. 5. Therefore, the pivot shaft 8a and the driving hub 21 are tilted in the direction of a straight line tangent to the track at a point corresponding to the magnetic heads, which further reduces the possibility of off-track error.

Furthermore, in this embodiment, since the bearing 8c is pressed against the two opposite edges B and C of the arcuate recess 53 formed in the hole 5b by the compression coil spring 51, the tilting direction of the pivot shaft 8a is unique and not arbitrary. Similarly, since the bearing biasing member 54 pushes the bearing 20 supporting the driving shaft 18, with the two elastic legs 54a at two positions on the outer circumference of the bearing 20, the bearing 20 is biased stably in a fixed direction.

The combination of the compression coil spring 51 and the groove 53, and the bearing biasing member 54 are employed in this embodiment as means for tilting the pivot shaft 8a and the driving shaft 18 of the motor 3, respectively, because they are considered to be suitable for such purposes in the recording and reproducing apparatus described herein as an exemplary recording and reproducing apparatus, however, any suitable means selected according to the constitution of the relevant recording and reproducing apparatus may be employed instead of those means employed in the embodiment of the present invention described hereinbefore.

Thus, the recording and reproducing apparatus according to the present invention provided with means for tilting the pivot shaft on which the swing arm swings and the driving shaft of the motor for driving the magnetic disks in the same direction is capable of restricting the possibility of off-track accident and stabilizing the recording and reproducing characteristics of the recording and reproducing apparatus.

Although the invention has been described in its preferred embodiment with a certain degree of particularity, it is to be understood that many changes and variations are possible in the invention without departing from the scope and spirit thereof.

What is claimed is:

1. An information recording and reproducing apparatus of the hard disk type, comprising:
    a rotatable driving hub supporting an information recording disk for rotation about a vertical axis;
    a motor disposed below said driving hub having a driving shaft secured to said driving hub, said driving shaft being supported by upper and lower bearings;
    a pivot assembly disposed to one side in a horizontal direction of said driving hub and disk, said pivot assembly having a vertically oriented pivot shaft supported by upper and lower bearings, a swing arm supported on an upper portion of said pivot shaft, and recording and reproducing heads attached to a free end of said swing arm, said heads being movable with said swing arm on said pivot shaft in a track seek direction over respective recording surfaces of the disk;
    first biasing means for biasing the lower bearing of said driving shaft in a horizontal direction to compensate for any tilting of said driving shaft due to mechanical error; and
    second biasing means for biasing the lower bearing of said pivot shaft in the same horizontal direction as said first biasing means to compensate for any tilting of said pivot shaft due to mechanical error and to limit the relative tilting error between said pivot shaft and said driving shaft to the least extent.

2. An information recording and reproducing apparatus according to claim 1, wherein the direction in which the lower bearing of the motor and the lower bearing supporting the pivot shaft are biased is perpendicular to the seek direction of the recording and reproducing heads.

3. An information recording and reproducing apparatus according to claim 1, wherein said means for biasing the lower bearing supporting the pivot shaft supporting the swing arm is a spring capable of pressing the lower bearing against two opposite edges of a recess formed at a position opposite to the spring in the inner surface of a hole accommodating the lower bearing.

* * * * *